UNITED STATES PATENT OFFICE.

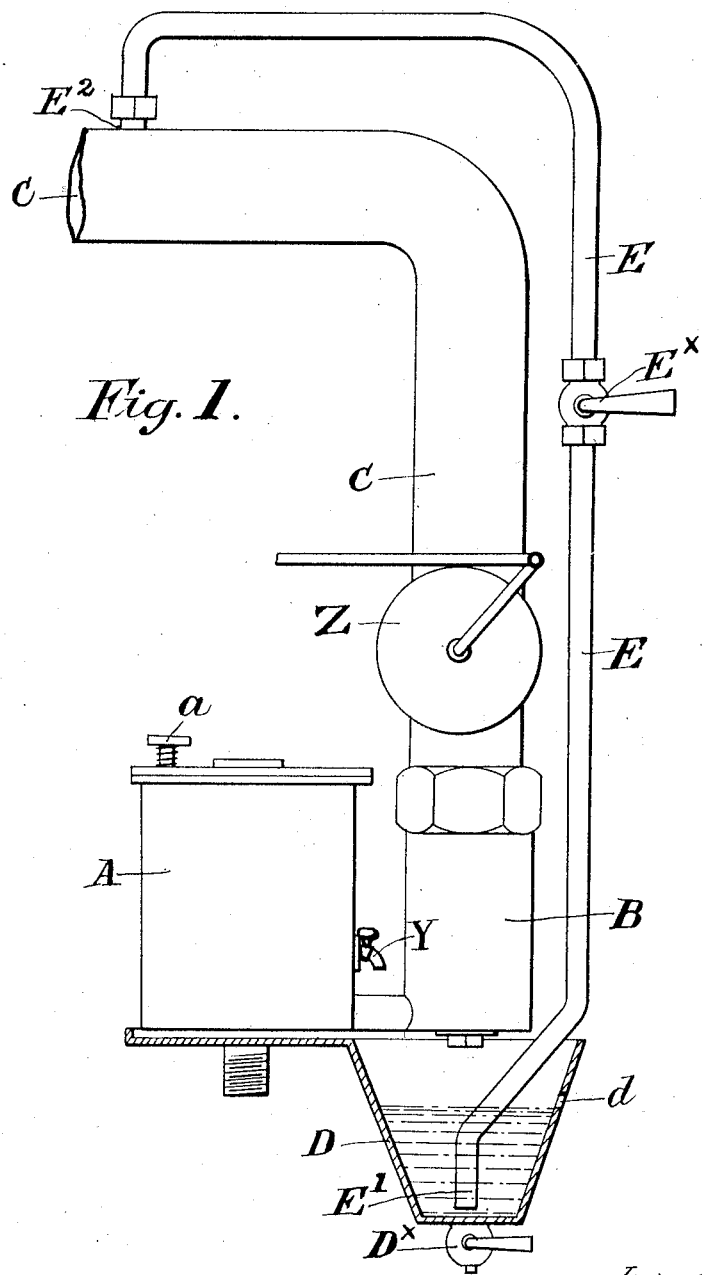

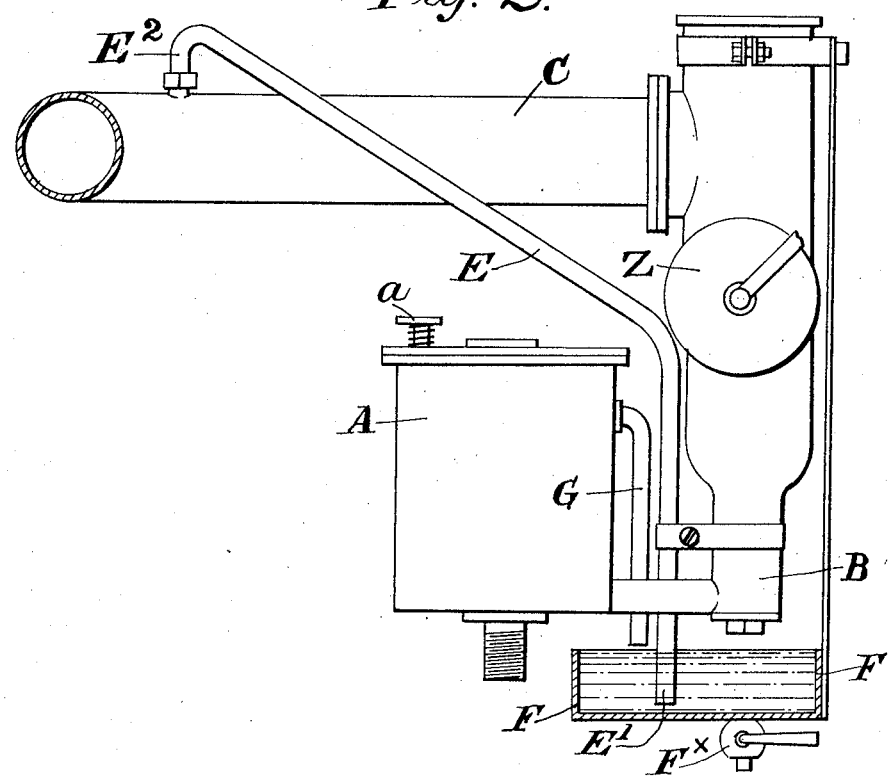

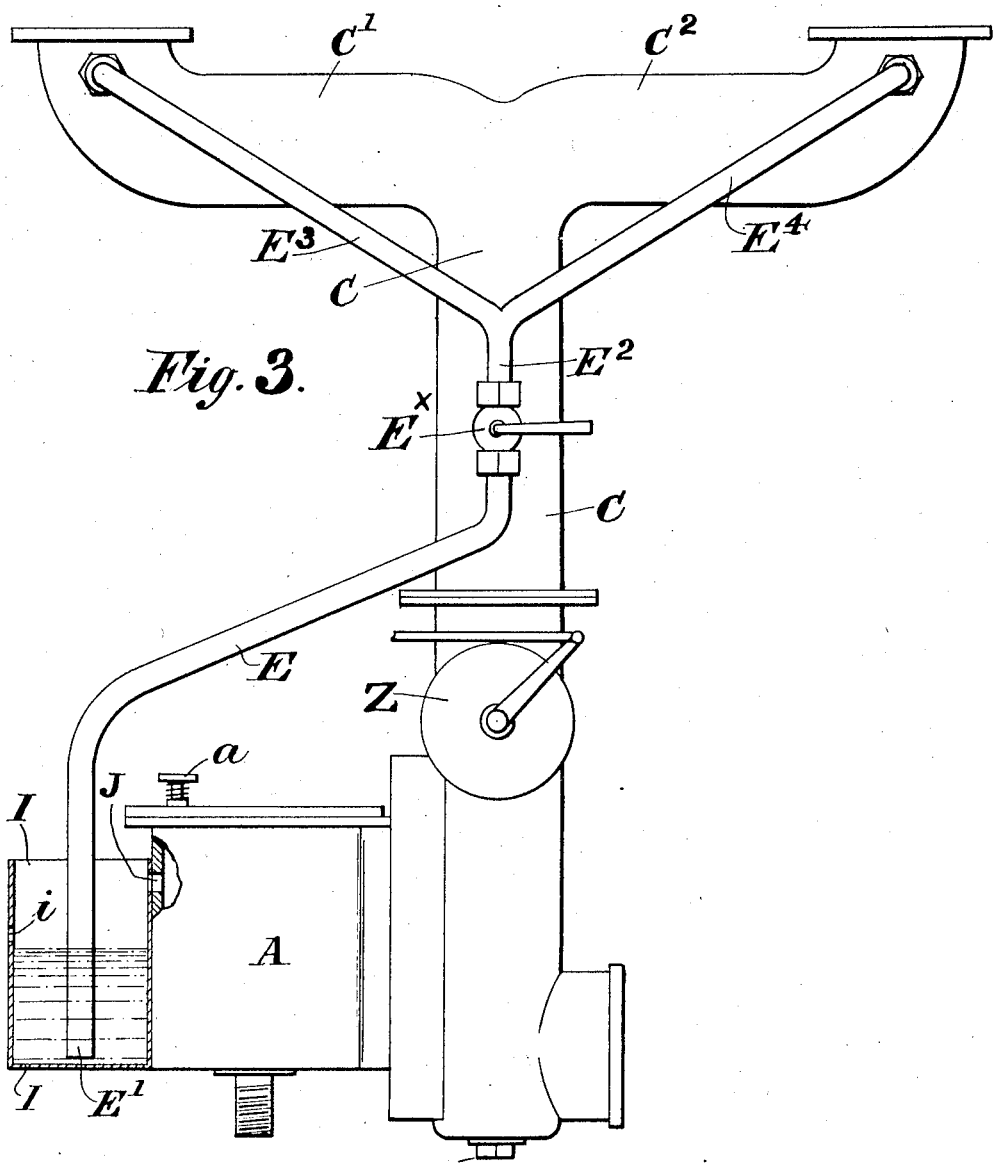

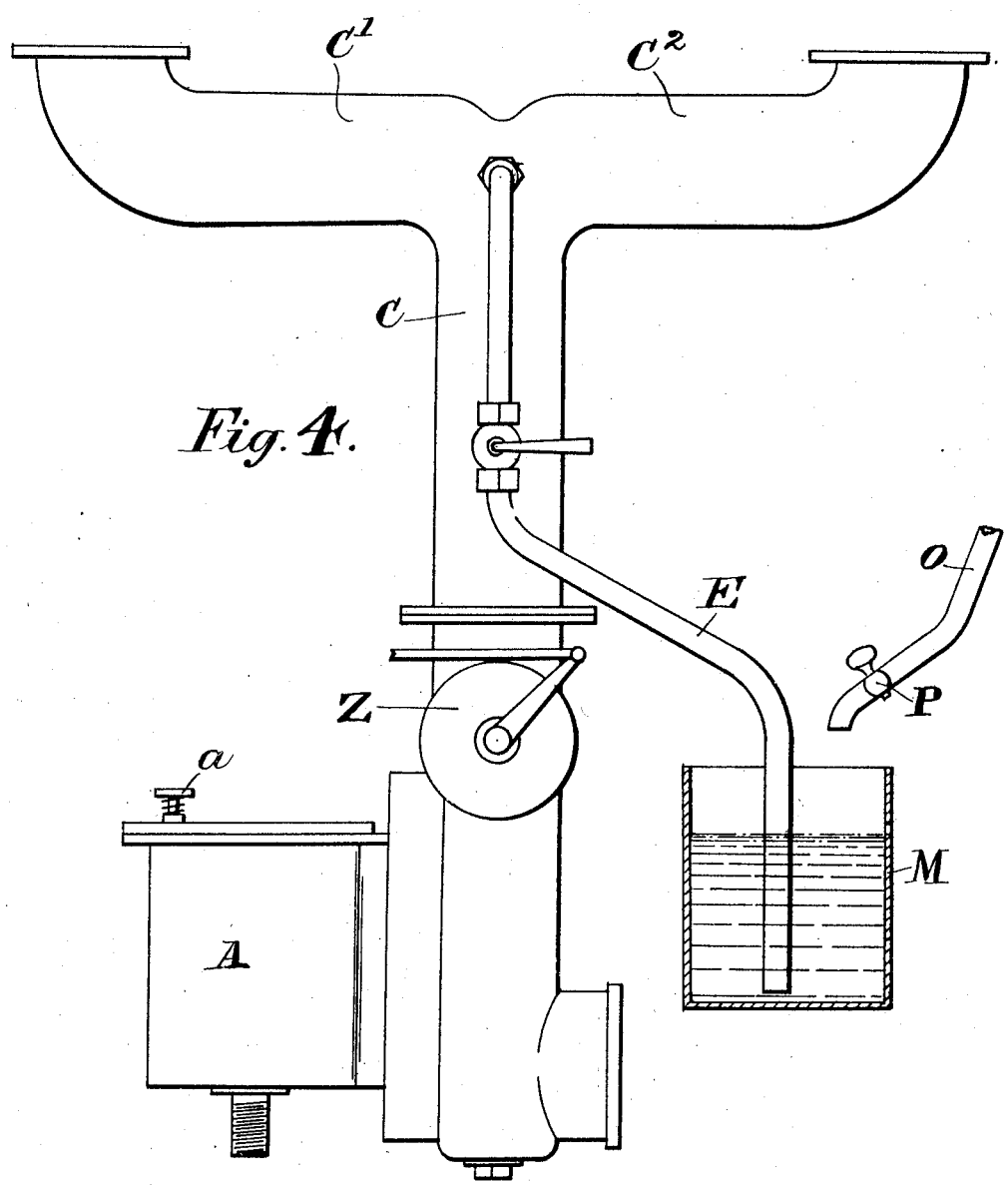

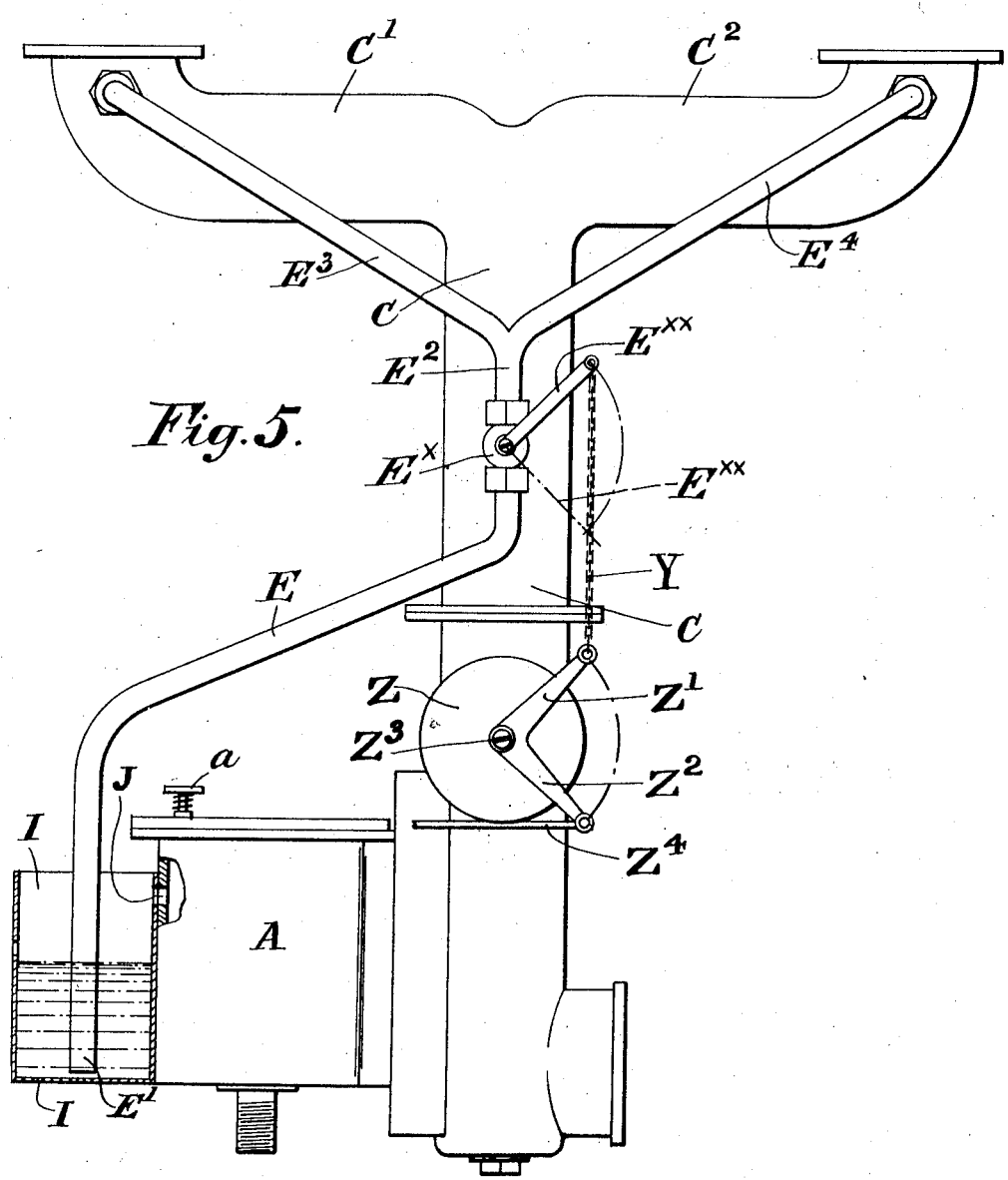

LEWIS ERNEST SITZLER, OF ESHER, ENGLAND.

MEANS FOR STARTING INTERNAL-COMBUSTION ENGINES.

1,331,853. Specification of Letters Patent. Patented Feb. 24, 1920.

Application filed January 4, 1916. Serial No. 70,190.

*To all whom it may concern:*

Be it known that I, LEWIS ERNEST SITZLER, electrical engineer a subject of the King of Great Britain residing at Linkwood, Ember Lane, Esher, in the county of Surrey, England, have invented new or Improved Means for Starting Internal-Combustion Engines, of which the following is a specification.

This invention relates to a new or improved means for starting or for assisting or facilitating starting internal combustion engines of the type in which an auxiliary supply or limited quantity of motor spirit is drawn into the induction pipe between the carbureter and engine cylinders.

The means for starting, or for assisting or facilitating starting, internal combustion engines according to the present invention comprise a vessel adapted to receive and hold therein a predetermined limited amount of motor spirit supplied thereto from the carbureter or otherwise as desired, such a vessel being situated below the point of entry of the auxiliary supply pipe into the induction pipe of the engine, and an auxiliary supply pipe leading from near the bottom of said vessel to a point or points in the induction pipe nearer to the explosion chamber than said carbureter and independent of the latter.

In carrying out this improved invention for starting or for assisting or facilitating starting a petrol motor, or the like spirit motor, I introduce a rich charge of motor spirit (*e. g.* petrol) at starting by means of an auxiliary pipe into a portion of the main inlet or induction pipe at or near the valves or at or near where the main inlet or induction pipe branches; the motor spirit which I will hereinafter refer to as "petrol" being sucked in either by the suction produced by part of a revolution or by one or more revolutions of the crank shaft, this auxiliary pipe thereafter either being closed or otherwise as desired.

As is well known difficulty is often experienced in starting internal combustion engines for example such as are employed for motor vehicles, aeroplanes and the like in which the fuel employed is either petrol or a heavier liquid hydrocarbon and particularly when the atmospheric temperature is low and when starting with the engine cold.

Now according to the present invention I introduce into the respective explosion chambers of an engine a rich mixture of petrol and air the amount of extra petrol being a definite amount (though capable of adjustment) and being admitted by means of said auxiliary pipe or conduit or passage (which I will term the "priming pipe") of any suitable bore though relatively of much smaller bore than the said main inlet pipe from the carbureter for example with motors of small power (such as 15—20 H. P.) I may employ a priming pipe of about one-eighth or three-sixteenths of an inch bore.

Adjacent to and advantageously beneath the carbureter is arranged a small cup, vessel, or tray (which I will hereinafter refer to as the "vessel") of suitable size and shape so designed and arranged as to catch the petrol which drips either from the carbureter jet or the lower point of the carbureter when flooded or petrol may be supplied to this vessel from any other suitable source as desired. This vessel holds and retains a small quantity or any suitable definite quantity of petrol which may be required to start the engine, and the lower end of the aforesaid priming pipe (which enters the main inlet pipe) is led down into this small vessel which collects the petrol which is supplied thereto as aforesaid.

In the accompanying drawings I have illustrated the invention as carried into practice in several alternative constructions.

Figure 1 is a view in elevation of a known form of carbureter and main inlet pipe leading therefrom to the engine cylinders showing one arrangement of the present invention applied thereto.

Figs. 2 and 3 and 4 are similar views showing alternative arrangements of the present invention.

Fig. 5 is a similar view to Fig. 3 showing the addition of means to mechanically close the tap E<sup>x</sup> when the throttle valve is opened and to thereafter leave the tap E<sup>x</sup> closed until the latter is re-opened by hand when again required to start the engine.

Referring to all the figures of the drawings:—

A is the float feed chamber and B is the jet chamber of any ordinary or suitable carbureter; and C is the main inlet pipe leading from said carbureter to the explosion chambers of the engine, Z is throttle valve of any suitable type but advantageously of the known type as indicated in the drawings. All these parts A. B. C. and Z being well-known and forming no part separately of the present invention.

Referring now to Fig. 1;

D is the vessel for holding the priming charge of petrol according to the present invention; and in this arrangement said vessel D is mounted upon and just below the carbureter and is located immediately below the jet in the jet chamber B, so that by depressing the plunger $a$ of the float chamber A and flooding the carbureter thereby petrol from the jet in the jet chamber B drips from the latter into and fills the said vessel D up to any desired point; the height of the petrol in this vessel D being regulated as desired for example by providing an outlet $d$ at the point indicated in Fig. 1 this will limit the amount of petrol held in the vessel D to the level of the said opening $d$.

E is a priming pipe one (open) end $E^1$ of which extends to near the bottom of the vessel D (which bottom end $E^1$ may be perforated or slotted as hereinafter described) and the other (open) end $E^2$ terminates in and discharges into the main inlet pipe C leading into the respective explosion chambers (not shown) of the engine; and advantageously this pipe E terminates at $E^2$ in the main inlet pipe C at a point near to the inlet valves of said explosion chambers.

$D^x$ is a drain tap in the bottom of said vessel D which is opened when it is desired to empty said vessel D or (and) prevent any accumulation of petrol in said vessel D.

$E^x$ is a tap in the priming pipe so as to enable said priming pipe to be closed (if desired) after the engine has been started.

Referring now to Fig. 2;

In this arrangement the vessel F for holding the priming charge of petrol is also located below the carbureter so that the petrol from the jet in the jet chamber B can drip into said vessel F, but, in addition, in this arrangement, the pipe G is led from the upper part of the float chamber A down to a point just above said vessel F so that when the carbureter is flooded (by depressing the plunger $a$) a supply of petrol will be quickly delivered from the float chamber A through the pipe G into the vessel F, at the bottom of which latter a drain tap $E^x$ may be arranged as shown.

E is the priming pipe one end of which $E^1$ extends to the lower part of this vessel F and the other end $E^2$ terminates in the main inlet pipe C as before explained; in the arrangement illustrated in Fig. 2 this priming pipe E discharges into the main inlet pipe C at a point close to where the latter connects to the manifold leading to the explosion chambers. This priming pipe E at its lower end $E^1$ may advantageously be slotted or otherwise provided with holes or openings near its said lower end $E^1$ so as to enable air to be drawn in with the petrol toward the end of the charge.

Referring to Figs. 3 and 5:—

In this arrangement the vessel I for holding the priming charge of petrol is arranged and mounted on the side of the float chamber A of the carbureter, a passage or opening J through the upper part of the side wall of the float chamber A permitting petrol from said float chamber A (when the latter is flooded by depressing the plunger $a$) to pass from said chamber A into said vessel I up to any desired level—for example up to the level of an opening $i$ provided at the desired height in the said wall I.

In this arrangement the priming pipe E has its lower end $E^1$ extending to near the bottom of said vessel I while at its lower end $E^2$ this priming pipe is branched or forked into branches $E^3$ $E^4$ which latter terminate and discharge at separate points in the manifold $C^1$ $C^2$ each point of discharge being advantageously near to the inlet valve of the explosion chamber.

$E^x$ is a tap provided in the priming pipe E for closing the latter, if desired, after the starting operation as aforesaid.

If desired the petrol may be delivered from the lower part of the float chamber A into either the vessel D or vessel F or vessel I by means of a pipe or outlet from said lower part which may be controlled by a tap such as Y as illustrated in Fig. 1.

Referring now to Fig. 5 which shows the means to mechanically close the tap $E^x$ when the throttle valve is opened and to thereafter leave the tap $E^x$ closed until the latter is reopened by hand as aforesaid, such means comprise a bell crank $Z^1$ $Z^2$ fixed to the shaft $Z^3$ of the throttle valve the lower arm $Z^2$ of the said bell crank having pivoted thereto the connecting rod $Z^4$ by which said throttle is operated in the usual way while the other arm $Z^1$ of said bell crank has attached thereto one end of a chain Y which at its other end is attached to the lever $E^{xx}$ by which the tap $E^x$ is operated.

With the bell crank $Z^1$ $Z^2$ and the lever $E^{xx}$ in the position shown in full lines in Fig. 5 the throttle is closed and the tap $E^x$ opened. After starting the engine when the throttle is opened (in the ordinary way) by operating the rod $Z^4$ thereby the lever $E^{xx}$ is pulled by the chain Y into the position indicated in dotted lines in Fig. 5 to thereby close the tap $E^x$ and leave same closed—as the subsequent operation of the throttle valve to either close or open the latter during the running of the engine will have no effect on the tap $E^x$ which will remain closed until restored into the open position by hand, when the priming device is again required for use.

Or instead of connecting the tap E<sup>x</sup> to the throttle valve Z in such manner that when the tap E<sup>x</sup> is fully closed when the main throttle valve is fully open, I may so connect the lever E<sup>xx</sup> of the tap E<sup>x</sup> to the arm Z<sup>1</sup> of the bell crank operating the throttle valve that when the tap E<sup>x</sup> is fully closed the throttle valve Z will be only partially opened and I may arrange means such as a coiled spring connected to the chain Y in such wise that the further opening of the throttle valve Z will only extend the spring after the priming tap E<sup>x</sup> has been fully closed. In order to effect this the arm E<sup>xx</sup> may be made shorter than the arm Z<sup>1</sup>.

Both the flooding of the carbureter and the opening of the priming tap may be effected by means of wires or rods run to points outside the bonnet of the car so that it will not be necessary to lift the bonnet of the car to effect these operations.

Referring now to Fig. 4:

In this arrangement the vessel M for holding the priming charge of petrol is mounted in any suitable position independently of the carbureter and petrol supplied thereto independently of the carbureter for example direct from the petrol reservoir (not shown) by means of a pipe O controlled by a tap or cock such as P.

E is priming pipe which acts as before described with reference to Figs. 1, 2 and 3 to lift the petrol from the vessel M and to deliver the limited charge of rich fuel mixture thus formed to the main inlet pipe C advantageously at a point or points as close as possible to the inlet valves of the engine and any way at a point or points closer to the explosion chambers than the carbureter independently of the latter.

By the means hereinbefore described a large temporarily acting petrol jet can be produced close to the inlet valves leading to the explosion cylinders of the engine, thus greatly facilitating starting when the engine is cold or in cold weather; and owing to the very rapid admission and large quantity of this charge of petrol the motor will start firing when rotated at a slower rate than would be otherwise required and the invention is therefore designed to quickly and easily start the engine.

For using the starting device the operation is as follows:—

(1) Close the main throttle Z of the engine.

(2) Next open tap E<sup>x</sup> (if used) on the priming pipe E.

(3) Fill the priming vessel (such as D or F or I or M) with the required charge of petrol.

(4) Then turn the engine by hand or by auxiliary motor or so called "self starter".

If the engine (especially if starting from the cold state) does not start at or before the fourth pull-up of the starting handle or second revolution of the crank shaft it will be advisable to partially or fully open the throttle and then pull up or rotate once more whereupon the engine will be found to start.

When the engine starts, any petrol then remaining in the vessel D or F or I or M will be rapidly lifted through the priming pipe E; and the tap E<sup>x</sup> on the priming pipe E may be closed as the engine shows signs of slowing down or else the throttle Z may be opened and the engine accelerated whereby the excess of petrol previously admitted by the priming pipe E will be rapidly used up and the tap E<sup>x</sup> may be closed at once with the engine running quickly.

In practice the engine will usually not require priming more than once for each start from the cold; and if the engine does not start when the aforesaid operation has been carried out this will show that such non-starting is due to some cause or causes other than the explosive mixture.

Usually the engine would not require priming when hot; nevertheless if the engine should be primed by mistake when hot this can be overcome by opening the throttle wide.

This device is relatively automatic in that the petrol is only lifted and shot into the main inlet pipe and reaches the interior of the cylinders properly mixed with air at the right moment and further after the vessel is emptied no more priming petrol is admitted which might upset the ordinary working mixture or by admitting too much petrol before starting cause the pistons to stall in the cylinders.

This priming device owing to this relatively automatic action is very suitable for use either with the ordinary crank handle or with a seat or other starter and any electrical or mechanical starting device such as are at present well known.

What I claim is:—

1. Means for facilitating starting internal combustion engines, comprising in combination a carbureter, means for supplying fuel to said carbureter, an induction pipe leading from said carbureter to the engine, a priming charge vessel adapted to contain a relatively small predetermined amount of priming charge independent of said carbureter and said means for supplying fuel to said carbureter, a priming auxiliary supply pipe exterior of said induction pipe and said carbureter and forming an independent conduit leading from near the bottom of said vessel to a point or points in said induction pipe nearer to the explosion chambers of the engine than said carbureter and independent of the latter, manually operated means for supplying said predetermined relatively small amount of priming charge to said vessel, said means being independent of said priming auxiliary supply pipe and independent of the supply of fuel from said carbureter of said induction pipe, said vessel being situated below the point of entry of said priming auxiliary supply pipe into said induction pipe, said relatively small amount of fuel adapted to be drawn unmixed with air into said induction pipe by suction produced by revolution of the crank shaft, said auxiliary supply pipe being open to the atmosphere after exhaustion of said priming charge from said vessel, air adapted to be drawn therethrough mixed or unmixed with fuel, and means in said auxiliary supply pipe adapted to control the passage of said priming charge and said air therethrough.

2. Means for facilitating starting internal combustion engines, comprising in combination a carbureter, means for supplying fuel to said carbureter, an induction pipe leading from said carbureter to the engine, a priming charge vessel adapted to contain a relatively small predetermined amount of priming charge independent of said carbureter and said means for supplying fuel to said carbureter, a priming auxiliary supply pipe exterior of said induction pipe and said carbureter and forming an independent conduit leading from near the bottom of said vessel to a point or points in said induction pipe nearer to the explosion chambers of the engine than said carbureter and independent of the latter, manually operated means for supplying said predetermined relatively small amount of priming charge to said vessel, said means being independent of said priming auxiliary supply pipe and independent of the supply of fuel from said carbureter of said induction pipe, said vessel being situated below the point of entry of said priming auxiliary supply pipe into said induction pipe, said relatively small amount of fuel adapted to be drawn unmixed with air into said induction pipe by suction produced by revolution of the crank shaft, said auxiliary supply pipe being open to the atmosphere after exhaustion of said priming charge from said vessel, air adapted to be drawn therethrough mixed or unmixed with fuel, and means in said auxiliary supply pipe adapted to control the passage of said priming charge and said air therethrough, a throttle valve in said induction pipe, and means connecting said throttle valve to said means for controlling the passage of said priming charge and said air through said auxiliary supply pipe so that as the main throttle is opened the supply of said air through said auxiliary supply pipe is shut off and thereafter remains shut off.

In witness whereof I have hereunto set my hand in presence of two witnesses.

LEWIS ERNEST SITZLER.

Witnesses:
EDWIN GANDER,
HENRY BIRDBECK.